United States Patent
Lee et al.

(10) Patent No.: US 9,017,117 B2
(45) Date of Patent: Apr. 28, 2015

(54) PROPULSION DEVICE FOR VESSEL AND VESSEL HAVING SAME

(75) Inventors: Tae Goo Lee, Daejeon (KR); Hyung Gil Park, Daejeon (KR); Kwang Jun Paik, Daejeon (KR); Dong Hyun Lee, Daejeon (KR); Jin Suk Lee, Daejeon (KR); Tetsuji Hoshino, Daejeon (KR)

(73) Assignee: Samsung Heavy Ind. Co., Ltd., Seoul (KR)

( * ) Notice: Subject to any disclaimer, the term of this patent is extended or adjusted under 35 U.S.C. 154(b) by 0 days.

(21) Appl. No.: 14/009,014

(22) PCT Filed: Sep. 23, 2011

(86) PCT No.: PCT/KR2011/007022
§ 371 (c)(1),
(2), (4) Date: Jan. 23, 2014

(87) PCT Pub. No.: WO2012/134003
PCT Pub. Date: Oct. 4, 2012

(65) Prior Publication Data
US 2014/0127035 A1    May 8, 2014

(30) Foreign Application Priority Data
Mar. 31, 2011   (KR) .................. 10-2011-0029584

(51) Int. Cl.
*B63H 21/17* (2006.01)
*H02K 16/02* (2006.01)
*H02K 55/04* (2006.01)
*B63H 5/10* (2006.01)
*H02K 7/14* (2006.01)

(52) U.S. Cl.
CPC *B63H 21/17* (2013.01); *H02K 7/14* (2013.01); *H02K 16/02* (2013.01); *H02K 55/04* (2013.01); *Y02E 40/625* (2013.01); *B63H 5/10* (2013.01); *B63H 2005/106* (2013.01)

(58) Field of Classification Search
USPC ......................................................... 440/6, 81
IPC ......................................................... B63H 5/10
See application file for complete search history.

(56) References Cited

U.S. PATENT DOCUMENTS
2004/0266277 A1* 12/2004 Ries .................................. 440/6

FOREIGN PATENT DOCUMENTS
| JP | 63-217968 A | 9/1988 |
| JP | 2010-528918 A | 8/2010 |
| KR | 2004-0004863 A | 1/2004 |
| KR | 2010-0096197 A | 9/2010 |

OTHER PUBLICATIONS
International Search Report (with English translation) dated Apr. 4, 2012 from PCT/KR2011/007022, 5 pages.

* cited by examiner

*Primary Examiner* — Stephen Avila
(74) *Attorney, Agent, or Firm* — Ohlandt Greeley Ruggiero & Perle L.L.P.

(57) ABSTRACT

Disclosed herein is a propulsion apparatus for ships. The propulsion apparatus, which includes a front propeller and a rear propeller to rotate in opposite directions and provides propulsion power to propel a hull of a ship, includes a power unit to supply power to rotate the rear propeller, a main shaft to transfer the power supplied from the power unit to the rear propeller, a hollow shaft extending in a longitudinal direction of the main shaft to allow the main shaft to pass therethrough and coupled to the front propeller, a drive motor including a rotor coupled to an outer circumferential surface of the hollow shaft and a stator supported by the hull, the drive motor rotating the hollow shaft in a direction opposite to a direction of rotation of the main shaft, and an electricity supply unit to supply electricity to the drive motor.

8 Claims, 2 Drawing Sheets

PROPULSION DEVICE FOR VESSEL AND VESSEL HAVING SAME

CROSS-REFERENCE TO RELATED APPLICATION(S)

This application claims the benefit of Korean Patent Application No. 10-2011-0029584, filed on Mar. 31, 2011, in the Korean Intellectual Property Office, the disclosure of which is incorporated herein by reference.

BACKGROUND

1. Field

Embodiments of the present invention relate to a propulsion apparatus for ships and a ship including the same.

2. Description of the Related Art

Contra-rotating propellers are an propulsion apparatus that may achieve high propeller efficiency by causing a rear propeller rotating in a direction opposite to the direction of rotation of a front propeller to receive rotational energy produced by the front propeller and convert the same into propulsion power (hereinafter, referred to as 'a contra-rotating propulsion apparatus').

In the case of conventional contra-rotating propulsion apparatuses, a rear propeller and a front propeller are respectively attached to a main shaft and a hollow shaft which are coaxially disposed and rotated in opposite directions by a planetary gear unit.

To effectively use such a contra-rotating propulsion apparatus, a very large planetary gear unit may be required. However, it may be very difficult to secure a space for installation of such a planetary gear unit of this size at the stern of a ship formed in a complex shape.

In addition, in the case that the planetary gear unit malfunctions, operation of the apparatus may be interrupted. Thereby, the propeller ceases to rotate and accordingly propulsion may be lost.

To secure the space for installation of the planetary gear unit, the planetary gear unit may be deployed in a forward position. In this case, the length of the hollow shaft increases by the distance that the planetary gear unit is moved. However, as the length of the hollow shaft increases, the area that needs to be lubricated to reduce friction between the hollow shaft and the main shaft may increase, and alignment work through installation of bearings in the shaft may become difficult.

SUMMARY

Therefore, it is an aspect of the present invention to provide a propulsion apparatus for ships that may be operated with one of the front propeller and rear propeller even when the other one of the front propeller and rear propeller does not function.

It is another aspect of the present invention to provide a propulsion apparatus for ships configured to reduce the length of the hollow shaft.

Additional aspects of the invention will be set forth in part in the description which follows and, in part, will be obvious from the description, or may be learned by practice of the invention.

In accordance with one aspect of the present invention, a propulsion apparatus for ships including a front propeller and a rear propeller to rotate in opposite directions and adapted to provide propulsion power to propel a hull of a ship, includes a power unit to supply power to rotate the rear propeller, a main shaft to transfer the power supplied from the power unit to the rear propeller, a hollow shaft extending in a longitudinal direction of the main shaft to allow the main shaft to pass therethrough and coupled to the front propeller, a drive motor including a rotor coupled to an outer circumferential surface of the hollow shaft and a stator supported by the hull, the drive motor rotating the hollow shaft in a direction opposite to a direction of rotation of the main shaft, and an electricity supply unit to supply electricity to the drive motor.

The propulsion apparatus may further include a controller to control a rate of rotation of the drive motor by controlling a frequency of electrical current supplied from the electricity supply unit to the drive motor.

The drive motor may be disposed inside a stern boss part of the hull.

A lubricant or a bearing may be interposed between the main shaft and the hollow shaft.

A propeller cap may be connected to an end of the main shaft exposed rearward by penetrating the rear propeller.

The drive motor may be a superconducting motor.

The rotor of the drive motor may include a superconducting coil, and a cooling chamber to accommodate coolant to cool the superconducting coil.

The propulsion apparatus may further include a coolant supply unit to supply coolant to the cooling chamber.

The coolant supply unit may include a housing including a first housing allowing the main shaft to rotatably pass therethrough, and a second housing fixed to the hull and rotatably coupled to the first housing to define a coolant accommodation portion for accommodation of the coolant in conjunction with the first housing, and a connection line to connect the coolant accommodation portion and the cooling chamber to each other, the connection line being coupled to the first housing.

In accordance with another aspect of the present invention, a ship includes a hull, and a propulsion apparatus for the ship installed at the hull.

In accordance with a further aspect of the present invention, a propulsion apparatus for ships includes a front propeller disposed outside of a stern boss part of a hull of a ship, a rear propeller dispose behind the front propeller, a power unit to supply power to rotate the rear propeller, a main shaft to transfer the power supplied from the power unit to the rear propeller, a drive motor disposed inside the stern boss part of the hull and adapted to rotate the front propeller in a direction opposite to a direction of rotation of the rear propeller, and a hollow shaft extending in a longitudinal direction of the main shaft to allow the main shaft to pass therethrough and adapted to transfer power of the drive motor to the front propeller.

The stern boss part may include an accommodation portion to accommodate the drive motor.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Figure 1:
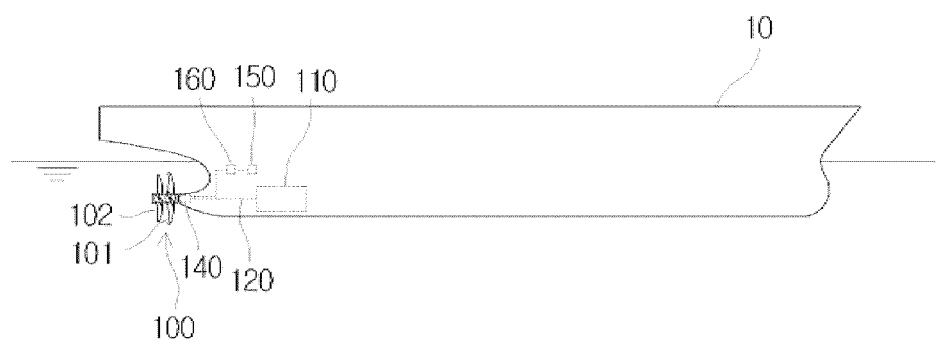
FIG. 1 is a side view showing a ship provided with a propulsion apparatus for ships according to one embodiment of the present invention.

Reference will now be made in detail to the embodiments of the present invention, examples of which are illustrated in the accompanying drawings, wherein like reference numerals refer to like elements throughout.

Figure 2:
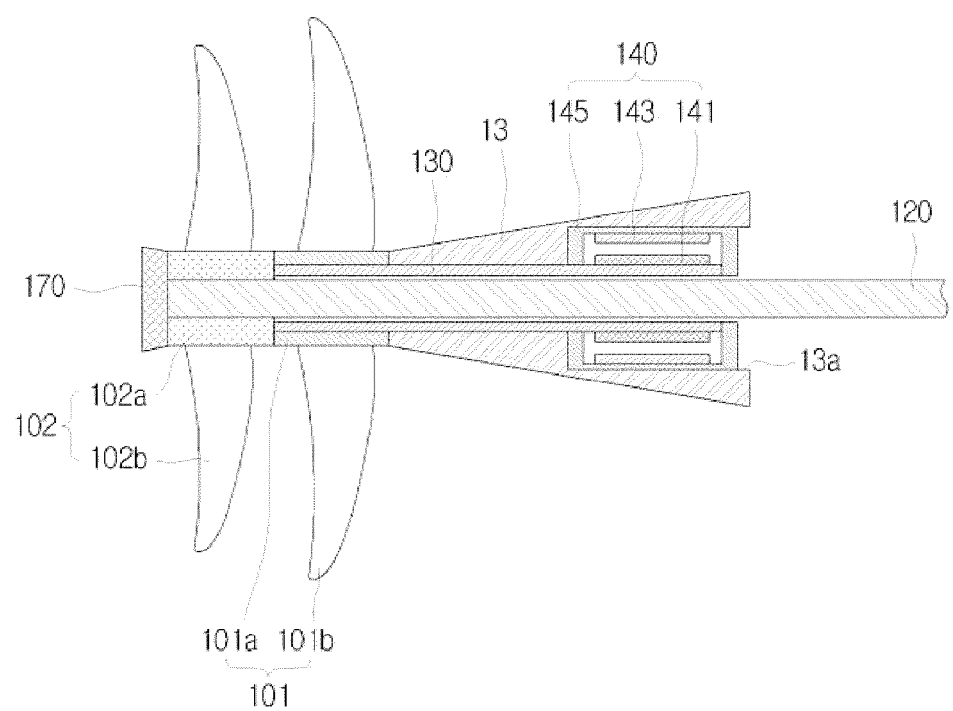
FIG. 2 is a cross-sectional view schematically showing a portion of a propulsion apparatus for ships according to one embodiment of the present invention.

FIG. 1 is a side view showing a ship provided with a propulsion apparatus for ships according to one embodiment of the present invention, and FIG. 2 is a cross-sectional view schematically showing a portion of a propulsion apparatus for ships according to one embodiment of the present invention. In FIGS. 1 and 2, the front of the ship is on the right side and the back of the ship is on the left side.

Referring to FIGS. 1 and 2, a propulsion apparatus for ships 100 is operated such that a front propeller 101 and a rear propeller 102, which provide propulsion power to propel a ship 1, rotate in the opposite directions. The propulsion apparatus for ships 100 includes a power unit 110, a main shaft 120, a hollow shaft 130, a drive motor 140, and an electricity supply unit 150.

The power unit 110, which rotates the main shaft 120, may include a diesel engine, a turbine, or a motor. The power unit 110 may be disposed in the hull 10.

The main shaft 120 transfers the power supplied from the power unit 110 to the rear propeller 102. The front end of the main shaft 120 is connected to the power unit 110, and the rear end of the main shaft 120 is coupled to the rear propeller 102. Herein, the rear propeller 102 may include, as can be seen from FIG. 2, a hub 102a coupled to the main shaft 120, and a plurality of blades 102b radially disposed about the outer circumferential surface of the hub 102a.

The main shaft 120 is rotatably supported in the hull 10 by a plurality of bearings (not shown). The main shaft 120 extends from the front side to the rear side, and a portion thereof is exposed to the exterior of the hull 10.

According to this embodiment, the main shaft 120 passes through the hollow shaft 130. Herein, the hollow shaft 130 is supported to rotate with respect to the main shaft 120. Herein, a lubricant (not shown) or bearings (not shown) may be interposed between the hollow shaft 130 and the main shaft 120. Thereby, the main shaft 120 may smoothly rotate with respect to the hollow shaft 130.

The hollow shaft 130 is arranged to extend in the longitudinal direction of the main shaft 120. A portion of the hollow shaft 130 is exposed to the exterior of the hull 10. The front propeller 101 is coupled to an end of the hollow shaft 130 exposed to the exterior of the hull 10. Herein, the front propeller 101 may include, as can be seen from FIG. 2, a hub 101a coupled to the outer circumferential surface of the hollow shaft 130, and a plurality of blades 101b radially disposed on the outer circumferential surface of the hub 101a. Although not shown, the front propeller 101 may alternatively include a plurality of blades radially disposed on the outer circumferential surface of the hollow shaft 130 without a hub.

By the drive motor 140, the hollow shaft 130 may be rotated in a direction opposite to the direction of rotation of the main shaft 120. The drive motor 140 may include a rotor 141 and a stator 143. In the drive motor 140, the rotor 141 is coupled to the outer circumferential surface of the hollow shaft 130, while the stator 143 is supported by the hull 10. Herein, the stator 143 is installed on the inner circumferential surface of a motor housing 145, which is coupled to and supported by the hull 10.

In the drive motor 140 configured as above, when electricity is supplied to the stator 143 supported and fixed by the hull 10, electromagnetic force acts between the rotor 141 and the stator 143, rotating the hollow shaft 130 coupled to the rotor 141.

The drive motor 140 is driven by electricity supplied from the electricity supply unit 150. The electricity supply unit 150 may include a generator or a storage battery. The electricity supply unit 150 may be disposed in the hull 10.

According to this embodiment, the electricity supply unit 150 to supply electricity to the drive motor 140 is provided separately from the power unit 110 to supply power to the main shaft 120. Thereby, when one of the electricity supply unit 150 and the power unit 110 malfunctions, propulsion power may be generated using the other thereof.

In addition, depending on the installation space, the size and number of the generators or storage batteries of the electricity supply unit 150 may be adjusted, and accordingly space utilization may be enhanced. For example, in the case that the space for installation of the electricity supply unit 150 is small, several generators or storage batteries having a low capacity may be disposed in the space. In the case that the space for installation of the electricity supply unit 150 is sufficient, one generator or storage battery having a large capacity may be disposed in the space.

The propulsion apparatus for ships 100 according to this embodiment may further include a controller 160 to control the rate of rotation of the drive motor 140. For example, in the case that the electricity supply unit 150 supplies alternating current, the controller 160 controls the rate of rotation of the drive motor 140 by controlling the frequency of the alternating current supplied from the electricity supply unit 150 to the drive motor 140.

According to this embodiment, the drive motor 140 may be disposed inside the stern boss part 13 of the hull 10. The stern boss part 13, which is a portion of the main shaft 120 protruding outward, may be manufactured via casting. The stern boss part 13 may be provided with an accommodation part 13a to accommodate the drive motor 140.

As the drive motor 140 to rotate the hollow shaft 130 is disposed inside the stern boss part 13, the hollow shaft 130 is shortened. Thereby, the lubrication area between the hollow shaft 130 and the main shaft 120 may be reduced, and alignment work through installation of bearings between the hollow shaft 130 and the main shaft 120 may be facilitated.

Moreover, as the drive motor 140 is disposed in the stern boss part 13, the need to secure a separate space for disposition of the drive motor 140 at the other portion of the hull 10 is eliminated.

According to this embodiment, a propeller cap 170 may be connected to the rear end of the main shaft 120 exposed rearward of the ship by penetrating the rear propeller 102. Thereby, the rear propeller 102 coupled to the main shaft 120 may be prevented from escaping from the main shaft 120. The propeller cap 170 may be connected to the rear end of the main shaft 120 by a fastening member such as a bolt or by welding.

Hereinafter, operation of the propulsion apparatus for ships 100 according to this embodiment will be described with reference to FIG. 2. The power supplied from the power unit 110 is transferred to the rear propeller 102 via the main shaft 120. In this case, the rear propeller 102 rotates along with the main shaft 120. At this time, the hollow shaft 130 is rotated, by the drive motor 140, in the direction opposite to the direction of rotation of the main shaft 120, and the front propeller 101 coupled to the hollow shaft 130 is rotated in the direction opposite to the direction of rotation of the rear propeller 102.

Figure 3:
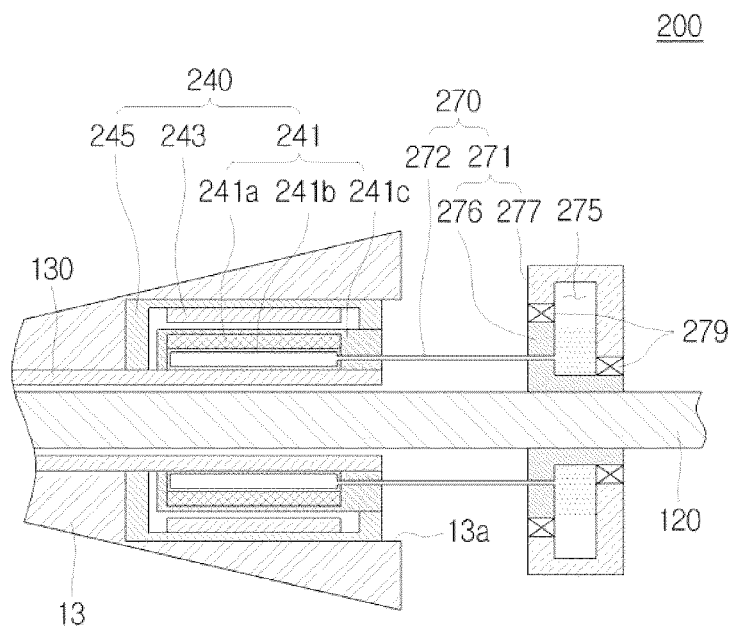
FIG. 3 is a cross-sectional view schematically showing a portion of a propulsion apparatus for ships according to another embodiment of the present invention.

FIG. 3 is a cross-sectional view schematically showing a portion of a propulsion apparatus for ships 200 according to another embodiment of the present invention. Referring to FIG. 3, the propulsion apparatus for ships 200 is different from the propulsion apparatus for ships 100 of the previous embodiment in that the propulsion apparatus for ships 200 uses a super conducting motor as the drive motor 240. Hereinafter, details of the propulsion apparatus for ships 200 different from those of the previous embodiment will be mainly discussed with reference to FIG. 3, and the constituents equal to those disclosed in the previous embodiment will be omitted.

According to this embodiment, the drive motor 240 is a superconducting motor. The drive motor 240 includes the rotor 241 and a stator 243. Herein, the rotor 241 may include a superconducting coil 241a and a cooling chamber 241b to accommodate a coolant to cool the superconducting coil 241a. The rotor 241 may further include an insulation member 241c to surround the superconducting coil 241a and the cooling chamber 241b.

The rotor 241 is coupled to the hollow shaft 130 to rotate along with the hollow shaft 130. Herein, the stator 243 is installed on the inner lateral surface of the motor housing 245 coupled to and supported by the hull 10.

The drive motor 240 configured as above is a superconducting motor, and may be manufactured such that the thickness of the rotor 241a is less than that of a typical motor. In addition, the drive motor 240 may have a smaller size than the typical motor. Thereby, a space for installation of the drive motor 240 may be easily secured, and the drive motor 240 may be easily disposed in such narrow a structure as the stern boss part 13.

According to this embodiment, the propulsion apparatus for ships 200 may further include a coolant supply unit 270 to supply coolant to the cooling chamber 241b of the drive motor 240. The coolant supply unit 270 may include a housing 271 to accommodate a coolant, and a connection line 272 to connect the housing 271 to the cooling chamber 241b.

Referring to FIG. 3, the housing 271 may include a first housing 276 allowing the main shaft 120 to rotatably pass therethrough, and a second housing 277 rotatably coupled to the first housing 276. The first housing 276 and the second housing 277 define a coolant accommodation portion 275 to accommodate a coolant. Herein, when installed, the second housing 277 is fixed to the hull 10 (see FIG. 1). Bearings 279 may be interposed between the portions of the first housing 276 and the second housing 277 that are coupled to each to other, and bearings (not shown) may be interposed between the first housing 276 and the main shaft 120. In addition, the portions of the first housing 276 and the second housing 277 that are coupled to each to other may be sealed.

The coolant accommodation portion 275 of the housing 271 and the cooling chamber 241b of the drive motor 240 may be interconnected by the connection line 272. Herein, the connection line 272 is coupled to the first housing 276. As the coolant accommodation portion 275 and the cooling chamber 241b are interconnected with the connection line 272 coupled to the first housing 276, the cooling chamber 241b, the connection line 272 and the first housing 276 may rotate simultaneously.

The coolant supply unit 270 may increase the internal pressure of the coolant accommodation portion 275 to supply the coolant stored in the coolant accommodation portion 275 to the cooling chamber 241b.

In addition, to fill the coolant accommodation portion 275 of the coolant supply unit 270 with the coolant, the coolant may be supplied to the coolant accommodation portion 275 from the outside.

As is apparent from the above description, according to one embodiment, an electricity supply unit to supply electricity to a drive motor to supply power to a hollow shaft is provided separately from a power unit to supply power to a main shaft. Accordingly, when either the electricity supply unit or the power unit malfunctions, the other thereof may be used to generate propulsion power.

In addition, as the drive motor to rotate the hollow shaft is disposed inside a stern boss part, the hollow shaft may be shortened, the lubrication area between the hollow shaft and the main shaft may be reduced, and alignment work involving installation of bearings between the hollow shaft and the main shaft may be facilitated.

In addition, the size and number of the generators or storage batteries of the electricity supply unit may be adjusted depending upon the installation space for accommodation of the electricity supply unit, and therefore space utilization may be enhanced.

Moreover, in the case that the drive motor is disposed in the stern boss part, the need to secure a separate space for disposition of the drive motor at the other portion of the hull is eliminated. Therefore, space utilization may be enhanced.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A propulsion apparatus for ships including a front propeller and a rear propeller to rotate in opposite directions and adapted to provide propulsion power to propel a hull of a ship, the propulsion apparatus comprising:

a power unit to supply power to rotate the rear propeller;

a main shaft to transfer the power supplied from the power unit to the rear propeller;

a hollow shaft extending in a longitudinal direction of the main shaft to allow the main shaft to pass therethrough and coupled to the front propeller;

a drive motor comprising a rotor coupled to an outer circumferential surface of the hollow shaft and a stator supported by the hull, the drive motor rotating the hollow shaft in a direction opposite to a direction of rotation of the main shaft;

an electricity supply unit to supply electricity to the drive motor, wherein the drive motor is a superconducting motor, the rotor of the drive motor comprising:

a superconducting coil, and a cooling chamber to accommodate coolant to cool the superconducting coil; and a coolant supply unit to supply coolant to the cooling chamber, wherein the coolant supply unit comprises:

a housing comprising a first housing allowing the main shaft to rotatably pass therethrough, and a second housing fixed to the hull and rotatably coupled to the first housing to define a coolant accommodation portion for accommodation of the coolant in conjunction with the first housing; and a connection line to connect the coolant accommodation portion and the cooling chamber to each other, the connection line being coupled to the first housing.

2. The propulsion apparatus according to claim 1, further comprising a controller to control a rate of rotation of the drive motor by controlling a frequency of electrical current supplied from the electricity supply unit to the drive motor.

3. The propulsion apparatus according to claim 1, wherein the drive motor is disposed inside a stern boss part of the hull.

4. The propulsion apparatus according to claim 1, wherein a lubricant or a bearing is interposed between the main shaft and the hollow shaft.

5. The propulsion apparatus according to claim 1, wherein a propeller cap is connected to an end of the main shaft exposed rearward by penetrating the rear propeller.

6. A ship comprising:
   a hull; and
   the propulsion apparatus according to claim 1, the propulsion apparatus being installed at the hull.

7. The propulsion apparatus according to claim 1, further comprising
   a front propeller disposed outside of a stern boss part of a hull of a ship; and
   a drive motor disposed inside the stern boss part of the hull.

8. The propulsion apparatus according to claim 7, wherein the stern boss part comprises an accommodation portion to accommodate the drive motor.

\* \* \* \* \*